SIGNAL INTEGRATOR AND CHARGE TRANSFER CIRCUIT

Original Filed July 6, 1965 2 Sheets-Sheet 1

SIGNAL INTEGRATOR AND CHARGE TRANSFER CIRCUIT

Original Filed July 6, 1965 2 Sheets-Sheet 2

United States Patent Office 3,529,177
Patented Sept. 15, 1970

3,529,177

SIGNAL INTEGRATOR AND CHARGE TRANSFER CIRCUIT

Joseph P. Pawletko, Endwell, N.Y., assignor to International Business Machines Corporation, Armonk, N.Y., a corporation of New York Original application July 6, 1965, Ser. No. 469,499, now Patent No. 3,471,832, dated Oct. 7, 1969. Divided and this application June 5, 1969, Ser. No. 830,644
Int. Cl. G06g *7/12*
U.S. Cl. 307—229 3 Claims

ABSTRACT OF THE DISCLOSURE

An improved signal integrating and charge transfer circuit is characterized by first and second capacitors which are normally isolated from each other. Input transistor means cause a voltage to be produced across the first capacitor which is substantially a linear function of the amplitudes of signals applied to the input. Transistor circuit means couple the first capacitor to the second capacitor through a low impedance circuit to transfer the voltage across the first capacitor to the second capacitor, after which the capacitors are again isolated from each other. Transistor means are provided for selectively discharging each of the capacitors at desired intervals.

Figure 1A:
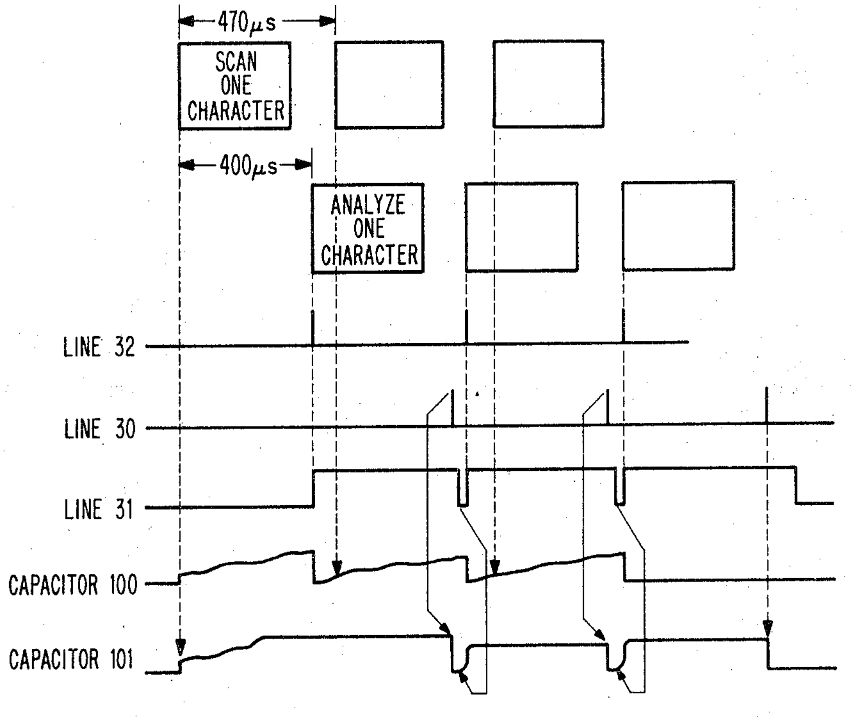

This application is a division of U.S. application Ser. No. 469,499 filed July 6, 1965, now U.S. Pat. 3,471,832.

The improved circuits of the present application have been particularly adapted for use in apparatus of the type in which a magnetic read head scans data printed in the form of magnetic ink characters; it will be appreciated however, that the invention is not to be limited thereto, nor to the specific embodiment disclosed, but only to the extent set forth in the appended claims.

The improved circuits of the present invention have been further adapted for use in apparatus of the type which scans characters which are printed in accordance with a unique format commonly referred to as the CMC–7 character font. This unique style consists of printing each character, i.e., letters, numbers, and special symbols, in the form of seven vertical bars with six horizontal gaps or spaces between the bars. The horizontal distance between the trailing of one bar and the trailing edge of the next succeeding bar is referred to as an interval. Each interval is one or the other of two predetermined horizontal widths, i.e., three-tenths millimeter or five-tenths millimeter. The six intervals of each character include four short intervals and two long intervals. The apparatus recognizes each character by measuring the intervals and decoding the short and long intervals in accordance with the time sequence in which they are sensed. Hence the intervals provide a two-out-of-six code.

The recognition logic responds only to the fact that there is a vertical bar in a specific horizontal position, whereby the segmenting of the bars does not have any effect.

It will be appreciated that the above-described type of character font gives rise to signal levels at the output of the read head which vary substantially in amplitude. In a typical application, maximum and minimum voltage levels are frequently in the order of three-tenths millivolt and sixteen millivolts, respectively. This is the minimum to maximum signal ratio in the order of about one to fifty-four.

In order to assure optimum operation of the recognition logic circuits, it is desirable to minimize this minimum to maximum signal ratio, for example, to a ratio in the order of one to six.

This is achieved by means of an improved variable gain amplifier having an improved gain level control circuit, the timing of which is controlled by the recognition logic circuits.

The improved gain level control circuit is characterized by first and second capacitors which are normally isolated from each other. While the first capacitor is being charged in accordance with the total energy content of the signals produced by the read head in scanning one complete character or symbol, the second capacitor has a charge, the value of which corresponds to the energy content of signals produced in response to the next preceding character which was scanned. This latter charge is applied to the shunt transistor to control the gain of the variable gain amplifier. At desired intervals, the second capacitor is discharged; then it is charged to a value corresponding to the value of the charge on the first capacitor. The capacitors are again isolated from each other, and the first capacitor is discharged in preparation for the scanning of the next succeeding character. The voltages across the capacitors are substantially a linear function of the amplitudes of the data signals which they integrate.

A delay line applies signals from the output of the read head to the variable gain amplifier only after the gain level control circuit has integrated the total energy of said signals in the first capacitor and transferred the charge to the second capacitor for control of the variable gain amplifier at a gain level which is inversely proportional to the total energy content of the data signals for that character.

It is an important object of the present invention to provide an improved circuit characterized by a first integrating capacitor, a second capacitor for receiving and storing a charge corresponding to that on the first capacitor, and improved means for alternatively isolating the capacitors from each other or coupling the capacitors to each other for a transfer of charge.

The foregoing and other objects, features and advantages of the invention will be apparent from the following more particular description of preferred embodiments of the invention, as illustrated in the accompanying drawings.

Figure 1B:
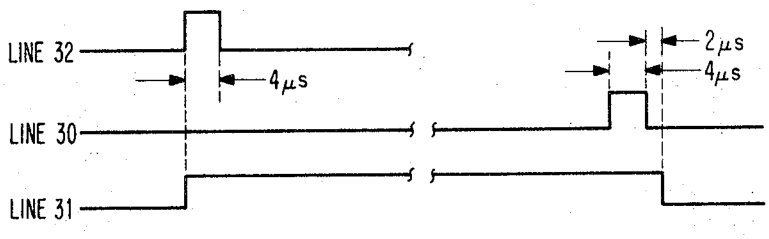
Figure 2:
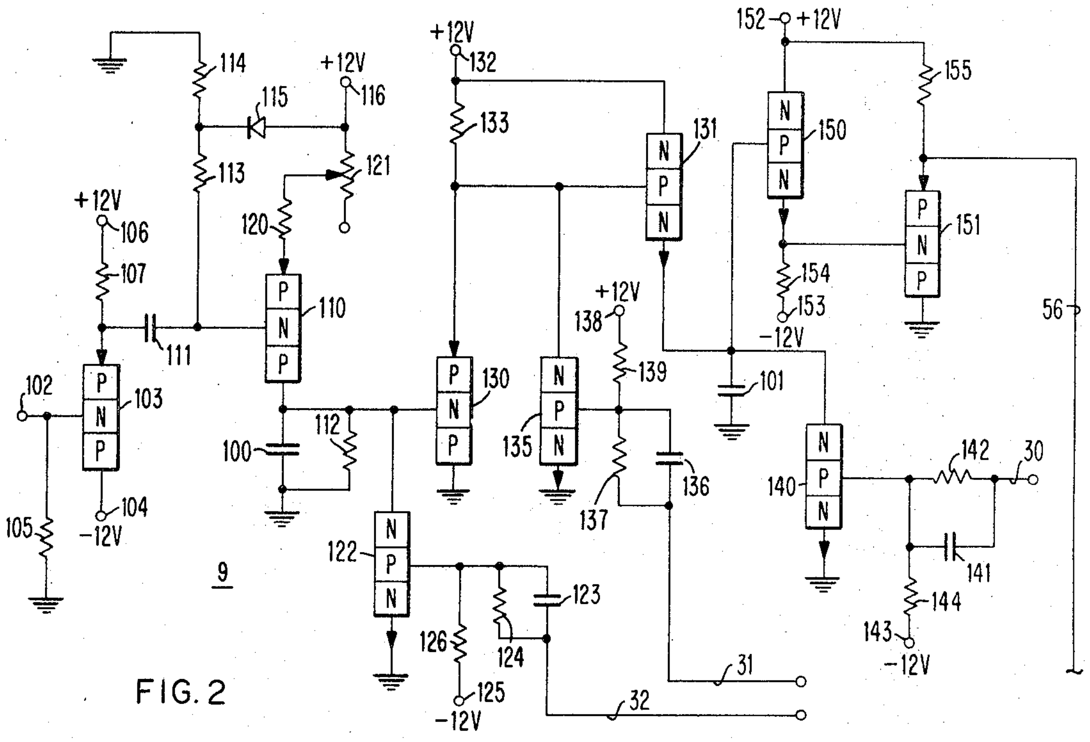

In the drawings:

FIGS. 1*a* and 1*b* illustrate control signals applied to the improved gain level control circuit; and FIG. 2 is a schematic diagram of a preferred embodiment of the improved gain level control circuit of the present application.

The operation of circuit 9 is controlled by timing pulses on three lines 30, 31 and 32 coming from a recognition logic circuit (not shown). The relative timing of the leading and trailing edges of these control signals and their time duration are illustrated in FIGS. 1*a* and 1*b* and will be described with respect to 43 and the resistor 45.

The gain level control circuit 9 of FIG. 2 includes a first capacitor 100 which integrates the seven bar signals of each character and a second capacitor 101 which is set in accordance with the integrated charge of the capacitor 100.

The bar signals are applied to an input terminal 102 (FIG. 2) of an emitter follower 103. The collector electrode of the emitter follower is connected to a negative supply terminal 104, its base electrode is connected to ground potential by way of a resistor 105, and its emitter electrode is connected to a positive supply terminal 106 by way of a resistor 107.

The emitter electrode of the emitter follower 103 is coupled to the base electrode of a transistor inverter 110 by means of a capacitor 111. The collector electrode of the inverter 110 is connected to ground potential by way of the integrating capacitor 100 and a shunt resistor 112. The base electrode of the inverter 110 is connected to a bias circuit comprising a pair of resistors 113 and 114 and a diode 115 which connects the junction between the resistors 113 and 114 to a positive supply terminal 116. The emitter electrode of the inverter 110 is connected to the supply terminal 116 by way of a resistor 120 and a potentiometer 121.

The collector electrode of the inverter 110 is connected to the collector electrode of a grounded emitter transistor amplifier 122. The amplifier 122 discharges the integrating capacitor 100 when it is turned on. The base electrode of the transistor amplifier 122 is connected to the input control line 32 by way of a capacitor 123 and a resistor 124. The base electrode of the amplifier 122 is connected to a negative supply terminal 125 by way of a resistor 126.

The integrating capacitor 100 is coupled to the gain level control capacitor 101 by means of first and second emitter followers 130 and 131. The collector electrode of the emitter follower 130 is connected to ground potential and its emitter electrode is connected to a positive supply terminal 132 by means of a resistor 133. The base electrode of the emitter follower 131 is connected directly to the emitter electrode of the emitter follower 130, its collector electrode is connected to the supply terminal 132, and its emitter electrode is connected directly to the control capacitor 101.

A grounded emitter transistor amplifier 135 has its collector electrode connected directly to the junction between the emitter and base electrodes of the emitter followers 130 and 131, respectively, to isolate the emitter followers from each other and thereby isolate the capacitors 100 and 101 from each other when the amplifier 135 is turned on to saturation. The base electrode of the amplifier 135 is coupled to the control line 31 by means of a parallel-connected coupling capacitor 136 and a resistor 137. The base electrode of the amplifier 135 is also connected to a positive supply terminal 138 by way of a resistor 139.

A grounded emitter transistor amplifier 140 has its collector electrode connected to the capacitor 101 for the purpose of discharging the capacitor 101 when the amplifier 140 is turned on to saturation. The base electrode of the amplifier 140 is connected to the control line 30 by means of a parallel-connected coupling capacitor 141 and resistor 142. The base electrode of the amplifier 140 is connected to a negative supply terminal 143 by means of a resistor 144.

The capacitor 101 is connected to the gain control line 56 by way of a pair of emitter followers 150 and 151. The base electrode of the emitter follower 150 is connected to the capacitor 101, its collector electrode is connected to a positive supply terminal 152, and its emitter electrode is connected to a negative supply terminal 153 by way of a resistor 154. The emitter electrode is also connected to the base electrode of the emitter follower 151. The collector electrode of the emitter follower 151 is connected to ground potential and its emitter electrode is connected to the line 56 and also to the positive supply terminal 152 by way of a resistor 155.

The operation of the control circuit 9 will now be described in detail. Reference is first directed to the waveforms of FIGS. 1*a* and 1*b* which illustrate the timing of circuit 9.

It can be seen from FIGS. 1*a* and 1*b* that when the first bar signal of a character is detected by the recognition logic circuits (that is, after approximately a four hundred microsecond delay), a four microsecond positive-going pulse is produced on the control line 32 for the purpose of discharging the integrating capacitor 100 preparatory to the scanning of the next character and the integrating of its bar signals.

Shortly after the scanning of a complete character, a positive-going pulse of a four microsecond duration is applied to the control line 30 to cause the discharge of the capacitor 101 preparatory to the transfer of a new charge from the integrating capacitor 100 to the control capacitor 101 for the bar signals of the next character to be passed through the amplifier 17.

Two microseconds after the termination of the pulse on the control line 30, the potential on the control line 31 goes negative until the first bar signal of the next character is received, that is, the time at which the potential on the line 32 goes positive.

It will be appreciated that this timing arrangement is given by way of example and that various arrangements may be had. The only requirement is that the capacitor 100 be discharged preparatory to the integration of the bar signals of a next succeeding character; that, before the discharge of the capacitor 100, the charge thereon be transferred to the control capacitor 101; and that, prior to the transfer of said charge, the preceding charge on the capacitor 101 be discharged. These three steps must occur subsequent to the scanning of a character and prior to the application of the signals of said character to a variable gain amplifier (not shown).

It will be further noted from FIGS. 1*a* and 1*b* that the potential on the conductor 31 does not go from its negative to its normally positive state until after the detection of the first character of a group of characters which is scanned. This is provided in the preferred embodiment because of certain requirements of the system not pertinent to the present invention.

With no bar signals applied to the input terminal 102 of the control circuit 9, the emitter follower 103 operates in the linear region. The transistor amplifier 110 is turned off; however, the base and emitter bias circuits cause the base-emitter junction to be biased very close to the onset of conduction, whereby even the slightest negative increase in base input potential will cause it to go rapidly into conduction. Thus it is at its turn-on threshold. This threshold is set primarily by means of the diode 115 whic his a germanium diode while the transistor 110 is a silicon device. The voltage differential remains relatively constant over the temperature range of interest.

It will be assumed that the capacitor 100 is completely discharged and that the transistor 135 is turned on to isolate the emitter followers 130 and 131 and to cause the emitter followers to be essentially nonconducting. The transistors 122 and 140 are cut off and the charge on the capacitor 101 is controlling the gain level of the amplifier via the emitter followers 150 and 151.

The positive and negative half cycles of the first bar signal are applied to the input terminal 102 and will produce a corresponding signal at the emitter electrode of the emitter follower 103. The negative half cycle will turn the transistor amplifier 110 on, thereby charging the capacitor 100 to a level which is proportional to the maximum amplitude of the half cycle and the setting of the rheostat 121.

The positive half cycle of the data bar signal is rejected by the transistor 110 which remains in its cut off state.

Similarly, the next six bar signals of the character turn the transistor 110 on during their negative half cycles to further charge the capacitor 100.

Discharge of the capacitor by way of the resistor 112 is partially compensated by the base current of the transistor 130 during the first character recognition cycle when transistor 135 is turned off and capacitors 100 and 101 are at the same level. The base leakage current of the transistors 122 and 130 assures that the charge on the capacitor 100 can only be decreasing. When the transistor 135 is on and turns the transistor 130 off, it prevents a positive buildup across the capacitor 100.

Shortly after the capacitor is charged in accordance with the seven bar signals, a positive pulse is applied to the control line 30 turning on the transistor amplifier 140 to discharge the capacitor 101. This, of course, occurs subsequent to the amplification of the bar signals of the preceding character by the amplifier 17. The transistor 140 then turns off, and two microseconds later the control line 31 goes negative to turn off the transistor 135. The charge on the capacitor 100 is now applied to the base electrode of the emitter follower 130.

At the same time, the emitter follower 131 is turned on, base current being supplied via the terminal 132 and the resistor 133. As the capacitor 101 charges positively, the base-emitter junction of the transistor 130 clamps the base electrode of transistor 131 at a voltage equal to the charge on the capacitor 100 plus the base-emitter voltage drop. Initially, the base-emitter junction of the transistor 130 is substantially nonconducting. As the voltage across the capacitor 101 approaches the voltage across the capacitor 100, the transistor 130 begins to conduct; and the voltage across the capacitor 101 is limited to that across the capacitor 100.

More particularly, the voltage at the emitter electrode of the transistor 130 will reach a value equal to the voltage across the capacitor 100 less the base-emitter drop of the emitter follower 130. This voltage appears at the base electrode of the emitter follower 131 to produce at the emitter electrode thereof a voltage which is more negative than the base electrode voltage by an amount equal to the base-emitter drop of the emitter follower 131. In the preferred embodiment, equal and opposite base-emitter voltage drops are desired; hence, the transistors in the emitter followers 130 and 131 are selected with closely matched characteristics. Thus the capacitor 101 will be charged exactly to the voltage level on the capacitor 100.

An important advantage of this charge transfer technique is that substantialy no charge on the capacitor 100 is lost during its transfer to the capacitor 101. Conventional electronic switches on the other hand, have a dynamic impedance which results in a charge loss, and also they have an offset voltage drop from collector to emitter.

Using switched emitter followers in the conventional manner results in charge loss since some of the base current is supplied by the capacitor.

However, in the present embodiment the capacitor 101 is charged via the terminal 132 and the emitter follower 131, the emitter follower 130 being held substantially nonconductive during the charge time of the capacitor 101.

After the capacitor 101 is charged, the voltage on the control line 31 again goes positive, turning on the transistor amplifier 135 to isolate the emitter followers 130 and 131. Shortly thereafter, a four microsecond positive pulse is applied to the control line 32, turning on the transistor amplifier 122 to discharge the capacitor 100.

The control circuit 9 is now ready to receive and integrate the seven bar signals of the next succeeding character. Also, the level in the capacitor 101 is now set at the desired value for controlling the gain of the amplifier.

It is noted that the voltage appearing at the emitter electrode of the emitter follower 150 is that of the voltage across the capacitor 101 minus the base-emitter junction drop of the emitter follower 150. Also, the potential on the control line 56 is that of the emitter electrode of the emitter follower 150 plus the base-emitter voltage drop of the emitter follower 151. If the transistors of the emitter followers 150 and 151 are selected so as to have closely matched characteristics, the voltage on the line 56 will be equal to the voltage across the capacitor 101.

Values for certain of the components in FIG. 2 are set forth below by way of example to illustrate an operable device. It will be appreciated, however, that other suitable values may be selected by those skilled in the art to suit their particular design objectives without departing from the teachings of the present application.

RESISTORS IN OHMS

| | |
|---|---|
| 105 | 56000 |
| 107 | 4700 |
| 112 | 51000 |
| 113 | 43000 |
| 114 | 12000 |
| 120 | 270 |
| 121 | 5000 |
| 124, 142 | 510 |
| 133 | 22000 |
| 154, 137 | 30000 |
| 139 | 62000 |
| 155 | 3600 |

CAPACITORS IN MICROFARADS

| | |
|---|---|
| 100, 101 | .047 |
| 111 | .0033 |
| 123, 141 | .0062 |
| 136 | .0001 |

While the invention has been particularly shown and described with reference to preferred embodiments thereof, it will be understood by those skilled in the art that the foregoing and other changes in form and details may be made therein without departing from the spirit and scope of the invention.

What is claimed is:

1. An integrating and change transfer circuit having an input terminal adapted to receive signals and having an output terminal comprising
   - a first capacitor;
   - a transistor amplifier normally biased substantially at its threshold of conduction, having its collector electrode coupled to the capacitor and having its base electrode capacitively coupled to the input terminal to change the capacitor in response to input signals of the predetermined polarity;
   - a second capacitor;
   - a pair of common emitter transistor switches having their collector electrodes connected respectively to the first and second capacitors and each selectively operated for discharging its respective capacitor;
   - a first pair of cascade-connected emitter followers having transistors of opposite conductivity types coupling the first capacitor to the second capacitor to charge the latter to a voltage equal to that across the former;
   - a third common emitter transistor switch having its collector electrode connected to the emitter followers and selectively operated for rendering the latter nonconducting to isolate the capacitors from each other; and
   - a pair of cascade-connected emitter followers having transistors of opposite conductivity types coupling the second capacitor to the output terminal.

2. An integrating and charge transfer circuit having an input terminal adapted to receive signals and having an output terminal comprising
   - a first capacitor;
   - a transistor amplifier normally biased substantially at its threshold of conduction, having its collector electrode coupled to the capacitor and having its base electrode capacitively coupled to the input terminal to charge the capacitor in response to input signals of a predetermined polarity;
   - a second capacitor;
   - a pair of common emitter transistor switches having their collector electrodes connected respectively to the first and second capacitors and each selectively operated for discharging its respective capacitor;
   - a first pair of cascade-connected emitter followers having transistors of opposite conductivity types coupling the first capacitor to the second capacitor to charge the latter to a voltage equal to that across the former; and a third common emitter transistor switch having its collector electrode connected to the emitter followers and selectively operated for rendering the latter nonconducting to isolate the capacitors from each other.

3. An integrating and change transfer circuit having an input terminal adapted to receive signals and having an output terminal comprising a first capacitor;

a transistor amplifier normally biased substantially at its threshold of conduction, capacitively coupled to the input terminal and effective to charge the capacitor in response to input signals of a predetermined polarity;

a second capacitor;

a pair of transistor switches connected respectively to the first and second capacitors and each selectively operated for discharging its respective capacitor;

a first pair of cascade-connected emitter followers having transistors of opposite conductivity types coupling the first capacitor to the second capacitor to charge the latter to a voltage equal to that across the former;

a third transistor switch connected to the emitter followers and selectively operated for rendering the latter nonconducting to isolate the capacitors from each other.

References Cited

UNITED STATES PATENTS

| | | | |
|---|---|---|---|
| 3,058,012 | 10/1962 | Harling | 307—254 X |
| 3,089,123 | 5/1963 | Hennis et al. | 307—229 X |
| 3,206,689 | 9/1965 | Santana | 307—246 X |
| 3,415,950 | 12/1968 | Bartz et al. | 328—169 X |

DONALD D. FORRER, Primary Examiner

S. D. MILLER, Assistant Examiner

U.S. Cl. X.R.

307—235, 246, 264; 340—146.3